(No Model.)

R. DE R. LAYTON.
MECHANICAL MOVEMENT.

No. 491,896. Patented Feb. 14, 1893.

Witnesses
Albert Speiden
Van Buren Hillyard.

Inventor
Ralph De Refer Layton.
By Attorneys
R. S. & A. P. Lacey

UNITED STATES PATENT OFFICE.

RALPH DE REFER LAYTON, OF ST. MATTHEW'S, SOUTH CAROLINA.

MECHANICAL MOVEMENT.

SPECIFICATION forming part of Letters Patent No. 491,896, dated February 14, 1893.

Application filed September 13, 1892. Serial No. 445,798. (No model.)

*To all whom it may concern:*

Be it known that I, RALPH DE REFER LAYTON, a citizen of the United States, residing at St. Matthews, in the county of Orangeburg, State of South Carolina, have invented certain new and useful Improvements in Mechanical Movements; and I do hereby declare the following to be a full, clear, and exact description of the invention, such as will enable others skilled in the art to which it appertains to make and use the same.

My invention relates to mechanical movement and is designed to convert a rotary into a reciprocating motion.

The purpose of the invention is to provide a cam and have the parts relatively adjustable to adapt the cam to the size of projection engaging therewith and also make provision for preserving a close joint and taking up wear between the cam and the part adapted to engage therewith.

Figure 1:
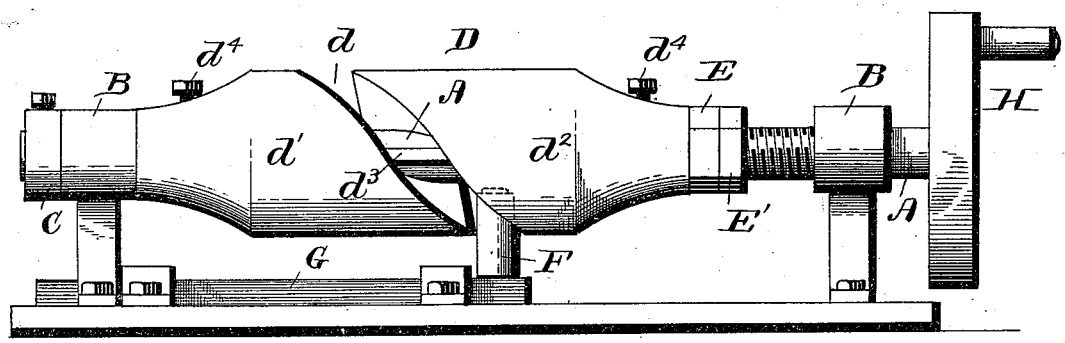
Figure 2:
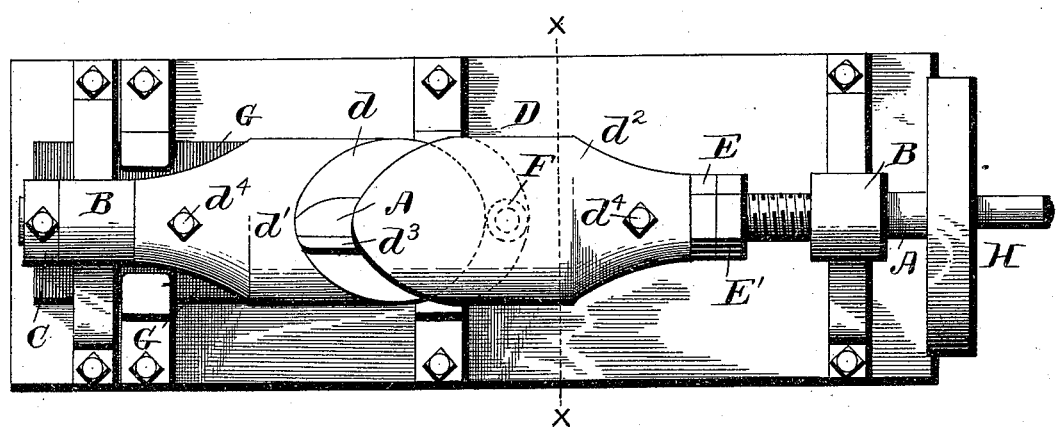
Figure 3:
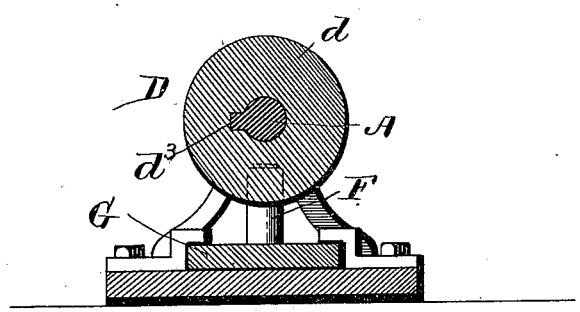

The invention consists of the novel features and the peculiar construction and combination of the parts which will be hereinafter more fully described and claimed and which are shown in the annexed drawings, in which;

Figure 1 is a side view of a mechanical movement embodying my invention. Fig. 2 is a top plan view of the invention showing the cam groove on the under side by dotted lines. Fig. 3 is a cross section on the line X—X of Fig. 2 looking in the direction of the arrow.

The driving shaft A is mounted in suitable bearing blocks B B' and is provided with a head D having a cam groove $d$. The head D is composed of two sections $d'$ $d^2$ which are so disposed on the driving shaft A as to provide the cam groove $d$ between their inner or opposing ends, which ends are similarly constructed so that the cam groove $d$ will be of uniform width through its length. The sections $d'$ $d^2$ are adapted to be moved on the shaft A to the required position and are held from turning on said shaft by means of a feather and spline connection $d^3$. When the sections are properly adjusted they are held on the shaft by means of binding screws $d^4$ which are threaded in the side of said sections and are adapted to be turned so as to cause their inner ends to bind against said shaft A. After the sections $d'$ and $d^2$ are once adjusted they are not moved except to compensate for wear or vary the width of the cam groove $d$ to adapt said groove to the size of the projection to travel therein. For this purpose the section $d^2$ is adjusted on the shaft A by means of two nuts E E' which are adapted to screw upon a threaded portion of said shaft. The nut E' serves as a jam nut and prevents the the loosening of the nut E, and by means of these two nuts E E' the section $d^2$ can be nicely adjusted. so that the cam groove $d$ can be regulated in width to receive the projection F without lost motion. The section $d'$ is adapted to have its end bear against the block B and a collar C adjustable on the outer end of said shaft A prevents longitudinal movement of the shaft A in its bearing, the bearing block B being held between the collar C and the section $d'$.

The bar G to be reciprocated is held in suitable ways by means of which it is guided in its various movements, and is provided with lateral projection F which extends into the cam groove $d$ and travels therein on the rotation of shaft A by means of which a reciprocating motion is imparted to bar G. This bar G is adapted to transmit motion to any mechanism designed to be operated thereby.

The shaft A is adapted to be driven in any desired manner and for the sake of convenience is shown as adapted to be operated by hand the crank H being provided at one end for this purpose.

The form of the cam groove $d$ is immaterial and will depend upon the nature of the work desired to be performed. In the present case the cam groove $d$ is shown extending spirally around the head D in opposite directions half way around said head and meeting, the oppositely inclined portions of the groove being symmetrical and meeting in a short turn, which turns are at diametrically opposite points of the head. Hence in one complete revolution of the shaft A the bar G will make one travel outward and return.

By having the cam adjustable on the shaft and adapted to bear at one end against one of the bearings B and the collar C also adjustable on the shaft and adapted to touch the opposite side of the said bearing B against which the cam lies, the sections of the cam can be adjusted to vary the width of the cam groove and the cam can be adjusted to adapt it to the position of the shaft and the lateral projection F.

Having thus described my invention what I claim, and desire to secure by Letters Patent is;—

1. In a mechanical movement the combination of a bar to be reciprocated having a lateral projection F, a shaft mounted in bearings and having a threaded portion, a cam adjustably mounted upon the shaft so as to turn therewith and composed of sections which are independently adjustable, and adapted to bear against one of the said bearings, nuts E and E', mounted on the threaded portion of the shaft to adjust one of the said sections, means for securing the said sections on the said shaft, and the collar C adjustable on the shaft and adapted to bear on the opposite side of the bearing touched by the said cam, substantially as shown for the purpose described.

2. In a mechanical movement, the combination of a reciprocating bar having lateral projection F, bearings B, shaft A mounted in the said bearings and having a threaded portion, a cam mounted on the shaft and having one end touching a bearing B and composed of independently adjustable sections which are held on the shaft by feather and spline connection, nuts E E' for adjusting one of the cam sections on the shaft, means for holding the cam sections in the desired position, and a collar C adjustable on the shaft and adapted to touch the opposite side of the bearing against which the said cam bears, substantially as set forth.

In testimony whereof I affix my signature in presence of two witnesses.

RALPH DE REFER LAYTON.

Witnesses:
L. N. RUSH,
A. W. SUMMERS.